United States Patent Office 3,033,848
Patented May 8, 1962

3,033,848
VINYL ESTERS OF NORCAMPHANECARBOXYLIC
ACIDS AND POLYMERS THEREOF
John R. Caldwell, Kingsport, Tenn., assignor to Eastman
Kodak Company, Rochester, N.Y., a corporation of
New Jersey
No Drawing. Filed Nov. 25, 1959, Ser. No. 855,263
12 Claims. (Cl. 260—85.5)

This invention relates to alkenyl esters of norcamphane monocarboxylic acids, and more particularly to vinyl esters of the above kind of acids, to polymers thereof, and to the preparation of these products.

The new compounds of the invention that are outstanding have the following general formula:

(I)
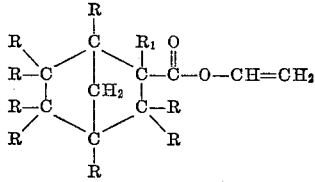

wherein each R represents hydrogen, a straight or branched chain alkyl group of from 1–8 carbon atoms e.g., methyl, ethyl, propyl, isopropyl, butyl, sec. butyl, pentyl, neopentyl, hexyl, heptyl, octyl, etc, groups, an aryl group e.g. phenyl, tolyl, etc. groups or a halogen such as chlorine, bromine or fluorine, and $R_1$ represents hydrogen or a straight or branched chain alkyl group of from 1–4 carbon atoms. The above defined esters are polymerizable to valuable resinous, linear polymers including their homopolymers and copolymers thereof with other polymerizable unsaturates containing a single —CH=C< group, but preferably a $CH_2$=C< group. These polymers are characterized by their improved resistance to hydrolysis in acid and alkaline media as compared with common vinyl carboxylic esters polymers represented, for example, by polyvinyl acetate. They also have improved resistance to weathering. They are also useful as viscosity stabilizers and pour point depressants in petroleum oils and ester type lubricants. They are especially valuable for the preparation of protective coatings from solutions thereof in one or more volatile solvents such as toluene, lower alcohols, acetone, methyl ethyl ketone, ethyl acetate, isopropyl acetate and butyl acetate.

It is, accordingly, an object of the invention to provide the above defined new class of vinyl esters of norcamphane carboxylic acids and polymers thereof that have improved resistance to hydrolysis and weathering. Another object is to provide a process for preparing the above compounds. Other objects will become apparent from the description and examples.

In accordance with the invention, we prepare the new vinyl esters by two general methods (a) by reacting acetylene with a norcamphanecarboxylic acid having the general structural formula:

(II)
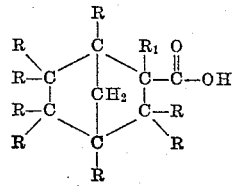

wherein R and $R_1$ are as previously defined, using zinc oxide or a mercury salt such as, for example, mercuric sulfate, mercuric phosphate, etc., as a catalyst, and (b) by an ester interchange reaction between the norcamphanecarboxylic acid as above defined and vinyl acetate. The intermediate norcamphanecarboxylic acids are conveniently made by condensing an α,β-unsaturated acid with cyclopentadiene, by the well-known Diels-Alder reaction, and hydrogenating the double bond in the condensation product. By using alkylated, arylated or halogenated cyclopentadienes and various α,β-unsaturated acids, a wide variety of norcamphanecarboxylic acids can be made. Further details of the general method for preparing such condensation products can be had by reference to K. Alder et al., Ann., 514, pages 197–211 (1934); and G. Komppa et al., Ber., 69B, pages 2606–10 (1936). Typical norcamphanecarboxylic acids that can be employed as intermediates include, 2-methyl-2-norcamphanecarboxylic acid, 2-propyl-2-norcamphanecarboxylic acid, 2-isobutyl-2-norcamphanecarboxylic acid, 3-methylnorcamphane-2-carboxylic acid, 3-n-propylnorcamphane-2-carboxylic acid, 3-neopentylnorcamphane-2-carboxylic acid, 3-n-octylnorcamphane-2-carboxylic acid, 3,3-dimethylnorcamphane-2-carboxylic acid, 5-methylnorcamphane-2-carboxylic acid, and the like.

The polymerizations for preparing the homopolymers and copolymers of the invention may be carried out in mass, in suspension in a nonsolvent such as water or in solution, and are accelerated by polymerization catalysts, by actinic light and by heat. Other suitable reaction mediums include alcohol, dioxane, acetone, etc. or mixtures of these solvents with water. Suitable polymerization catalysts include peroxides such as benzoyl peroxide, acetyl peroxide, lauroyl peroxide, di-ter.-butyl peroxide, hydrogen peroxide, etc., persulfates such as sodium, potassium and ammonium persulfates, etc., perborates such as sodium and potassium perborates, and the like. Azo-bis-isobutyronitrile can also be employed as a catalyst. The amount of catalyst used can vary from about 0.1 to 3.0%, based on the weight of the monomer to be polymerized. The temperature can vary over a wide range, but preferably at about from 30–100° C. When carried out in a water medium, an activating agent such as an alkali metal bisulfite e.g. sodium or potassium bisulfite may advantageously be used in about the same amount as the catalyst. Also, it is advantageous in aqueous systems to employ surface active agents such as fatty alcohol sulfates e.g. sodium or potassium cetyl sulfate, sodium or potassium lauryl sulfate, etc., aromatic sulfonates e.g. sodium or potassium salts of alkylnaphthalene sulfonic acid, sulfonated oils, and the like. For bead or granular polymerizations, relatively poor dispersing agents such as starch, methylated starch, gum arabic, polyvinyl alcohol, partially hydrolyzed polyvinyl acetate, etc. can be employed. The amount of surface active agent employed can vary from about 0.5–2.0%, based on the weight of the monomers to be polymerized. Mixtures of these surface active agents can also be used. The polymerization reaction mixtures are advantageously stirred, shaken or tumbled during the reaction. If desired, a chain regulator such as an alkyl mercaptan, e.g. hexyl, cetyl, lauryl, etc. mercaptans can also be added with advantage to the aqueous polymerization reaction mixtures.

The copolymers of the invention can vary about from 10–90% by weight of the norcamphanecarboxylic vinyl esters and conversely from 90–10% by weight of one or more other polymerizable compounds known to interpolymerize with vinyl acetate, for example, vinyl esters of saturated fatty acids containing from 2-4 carbon atoms e.g. vinyl acetate, vinyl propionate, vinyl butyrate, etc., acrylic and methacrylic acids and their alkyl esters, nitriles, amides, and N-alkyl and N,N-dialkyl substituted amides, wherein the said alkyl groups in each instance contain from 1-4 carbon atoms e.g. methyl, ethyl, propyl, isopropyl, butyl, isobutyl, etc., acrylates and methacrylates, acrylonitrile, methacrylonitrile, acrylamide, methacrylamide, N-methyl methacrylamide, N,N-dimethylacrylamide, N,N-dimethylmethacrylamide, etc., styrene, α-methylstyrene, vinyl chloride, vinylidene chloride, vinyl alkyl ketones wherein the alkyl group contains from 1-4 carbon atoms e.g. vinyl methyl ketone, vinyl butyl ketone, etc., and similar polymerizable compounds.

The following examples will serve to illustrate further our new monomeric esters and polymers thereof.

*Example 1*

2-methyl-2-norcamphanecarboxylic acid was prepared by the Diels-Alder reaction from cyclopentadiene and methacrylic acid, followed by hydrogenation of the double bond. One hundred parts by weight of 2-methyl-2-norcamphanecarboxylic acid prepared as above and 10 parts of the zinc salt of the acid were placed in an autoclave. One hundred parts of toluene was added and a mixture of 2 parts acetylene and 1 part nitrogen was introduced at 180° C. and 20-25 atm. pressure. More acetylene was added as the pressure dropped. After 20 hours, the product was taken from the autoclave and filtered to remove the zinc salt. The product was distilled to give a 60-70% yield of the vinyl ester, B.P. 120-130/3 mm. It had the structural formula:

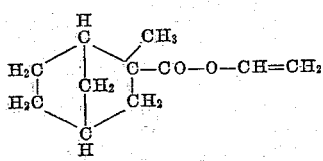

*Example 2*

Cyclopentadiene and crotonic acid were condensed by the Diels-Alder reaction and the product was hydrogenated to give 3-methylnorcamphane-2-carboxylic acid. The vinyl ester was prepared by heating the acid, with mercuric phosphate catalyst, under 200 lb./sq.in. acetylene pressure at 80-100° C. The vinyl ester of 3-methylnorcamphane-2-carboxylic acid boiled at 120-128/3 mm. It had the structural formula:

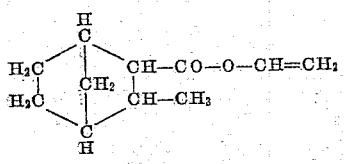

*Example 3*

Dimethylacrylic acid was condensed with cyclopentadiene as described in G. Komppa et al., Ber., 69, 2606 (1936). The unsaturated acid was hydrogenated to 3,3-dimethylnorcamphane-2-carboxylic acid. The acid was converted to the vinyl ester by treating with vinyl acetate and mercuric sulfate catalyst as described in J. Org. Chem., 14, 1057 (1949). The vinyl ester boiled at 132-137/12 mm. and had the structural formula:

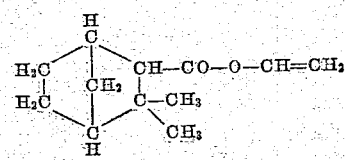

*Example 4*

Methylcyclopentadiene was condensed with acrylic acid by the Diels-Alder reaction and the product was hydrogenated to methylnorcamphane-2-carboxylic acid. The vinyl ester was made by treating the acid with acetylene, using the zinc salt as catalyst. The ester boiled at 120-130° C./3 mm.

*Example 5*

2-hexenoic acid was condensed with cyclopentadiene by the Diels-Alder reaction and the product was hydrogenated to 3-propylnorcamphane-2-carboxylic acid. The vinyl ester was prepared by interchange with vinyl acetate as described in Example 3. The ester boiled at 130-136° C./3 mm.

*Example 6*

Cyclopentadiene was condensed with methacrylic acid by the Diels-Alder reaction. The unsaturated acid was chlorinated in the double bond to form the dichloro compound. The vinyl ester was produced by ester interchange with vinyl acetate, i.e. the vinyl ester 5,6-dichloro-2 - methyl - 2 - norcamphanecarboxylic acid. The ester boiled at 150-165° C./0.5 mm.

*Example 7*

Cyclopentadiene was condensed with cinnamic acid by the Diels-Alder reaction, and the product was hydrogenated to reduce the double bond and give 3-phenylnorcamphane-2-carboxylic acid. The vinyl ester was prepared by reaction with acetylene. It had the structural formula:

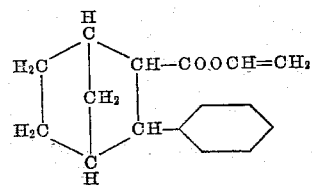

The above ester boiled at 162-177° C./0.5 mm.

*Example 8*

One hundred parts of the vinyl ester of 2-methyl-2-norcamphanecarboxylic acid (Example 1), one part of benzoyl peroxide, one part of polyvinyl alcohol, and three hundred parts of water were placed in a bottle. The bottle was tumbled at 60-70° C. for 24 hours. The polymer was formed as beads or granules, in a yield of 70-80%. The product was molded at 120-130° C. to give clear, hard chips. A sample of the polymer refluxed with alcohol KOH for 6 hours showed substantially no hydrolysis. Under the same conditions, polyvinyl acetate was completely hydrolyzed in a few minutes. Films and coatings made from this polymer are valuable for outdoor applications where resistance to weathering is important.

*Example 9*

The vinyl ester of 3-methylnorcamphanecarboxylic acid (Example 2) and isobutyl acrylate were copolymerized by the following method:

50 g. vinyl ester
50 g. isobutyl acrylate
4 g. sodium octadecyl sulfate
1 g. potassium persulfate
300 g. water The mixture was stirred at 60-65° C. for 24 hours. The resulting emulsion was useful as a component of water paints. A portion of the copolymer was isolated by coagulating the emulsion with sodium sulfate. The polymer was soluble in the common lacquer solvents and gave films and coatings that showed excellent resistance to weathering.

*Example 10*

One hundred parts of the vinyl ester of 3,3-dimethylnorcamphane-2-carboxylic acid, one part of polyvinyl alcohol, 1 part of benzoyl peroxide, and three hundred parts of water were agitated at 70-80° C. for 30 hours. The polymer was filtered off as beads or granules. The product gave clear, tough molded and extruded objects. It was soluble in the common lacquer solvents and films cast from the solution showed excellent resistance to weathering. It had a softening point of 85–100° C.

Example 11

One hundred parts of the vinyl ester of 5,6-dichloro-2-methyl-2-norcamphanecarboxylic acid and 2 parts of benzoyl peroxide were dissolved in 100 parts of tert-butyl alcohol and the solution was heated at 60–70° for 24 hours. One gram of benzoyl peroxide was added and the solution was heated 24 hours longer. The polymer was precipitated in methyl alcohol. It softened at 110–125° C. It was soluble in the common lacquer solvents. This polymer has a slow burning rate and is useful as a molding plastic.

Example 12

A copolymer was prepared from 60 parts of the vinyl ester of 2-methyl-2-norcamphanecarboxylic acid and 40 parts of ethyl acrylate. This composition was soluble in the common lacquer solvents and was valuable as a protective coating for outside use because it showed good weathering properties.

Example 13

An emulsion copolymer was made from 55 parts of the vinyl ester of 3-methylnorcamphane-2-carboxylic acid and 45 parts n-butyl acrylate. Evaporation of the emulsion gave a tough film with excellent weathering properties. The emulsion was valuable as a latex-type paint for outdoor use.

Part of the emulsion was coagulated with sodium sulfate and the polymer was washed and dried. It softened at 30–40° C. It was useful as a thickening agent in ester-type synthetic lubricants.

Example 14

A copolymer was prepared from 85 parts acrylonitrile and 15 parts of the vinyl ester of 2-methyl-2-norcamphanecarboxylic acid. The copolymer gave fibers that had a hot bar sticking temperature of 210–222° C. The fibers dyed well with disperse type dyes.

By proceeding as set forth in the above examples, other vinyl esters of norcamphanecarboxylic acids represented by Formula I can be readily prepared, as well as the corresponding homopolymers and the copolymers thereof with any of the mentioned other polymerizable compounds. The solutions or dopes of the polymers of the invention can be coated as films and sheets that are useful as protective coatings and photographic film supports. The polymers can also be molded into shaped articles by injection and compression molding techniques. All the articles prepared as above show high resistance to hydrolysis as compared with polyvinyl carboxylic esters represented, for example, by polyvinyl acetate. The compositions whether designed for use in the form of their solutions or dopes or in the form of solid molding compositions can if desired, have incorporated therein suitable fillers, coloring matter, plasticizers, and the like.

The invention has been described in detail with particular reference to preferred embodiments thereof, but it will be understood that variations and modifications can be effected within the spirit and scope of the invention as described hereinabove and as defined in the appended claims.

What I claim is:

1. A compound of the general formula:

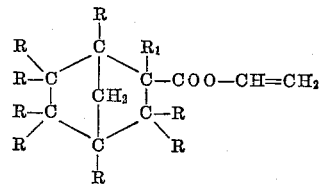

wherein each R represents a member selected from the group consisting of hydrogen, an alkyl group of from 1–8 carbon atoms, a phenyl group, a tolyl group, chlorine, bromine and fluorine, and $R_1$ represents a member selected from the group consisting of hydrogen and an alkyl group of from 1–4 carbon atoms.

2. Vinyl ester of 2-methyl-2-norcamphanecarboxylic acid.

3. Vinyl ester of 3-methylnorcamphane-2-carboxylic acid.

4. Vinyl ester of 3,3-dimethylnorcamphane-2-carboxylic acid.

5. Vinyl ester of 5,6-dichloro-2-methylnorcamphane-2-carboxylic acid.

6. Vinyl ester of 3-phenylnorcamphane-2-carboxylic acid.

7. A resinous, linear polymer of a compound of the general formula:

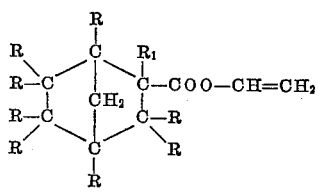

wherein each R represents a member selected from the group consisting of hydrogen, an alkyl group of from 1–8 carbon atoms, a phenyl group, a tolyl group, chlorine, bromine and fluorine, and $R_1$ represents a member selected from the group consisting of hydrogen, and an alkyl group of from 1–4 carbon atoms.

8. Homopolymer of the vinyl ester of 2-methyl-2-norcamphanecarboxylic acid.

9. Homopolymer of the vinyl ester of 3,3-dimethylnorcamphane-2-carboxylic acid.

10. A copolymer of from 10–90% by weight of the vinyl ester of 3-methylnorcamphane-2-carboxylic acid and conversely from 90–10% by weight of isobutyl acrylate.

11. A copolymer of from 10–90% by weight of the vinyl ester of 2-methyl-2-norcamphanecarboxylic acid and conversely from 90–10% by weight of acrylonitrile.

12. Homopolymer of the vinyl ester of 5,6-dichloro-2-methyl-2-norcamphanecarboxylic acid.

References Cited in the file of this patent

UNITED STATES PATENTS 2,797,227    Jenkins      June 25, 1957

FOREIGN PATENTS 582,721    Great Britain      Nov. 26, 1946

OTHER REFERENCES

Bode: Chemical Abstracts, vol. 31, July-September 1931, p, 6221.